United States Patent
Son et al.

(10) Patent No.: US 7,287,703 B2
(45) Date of Patent: Oct. 30, 2007

(54) REMOVABLE MEMORY CARDS INCLUDING USB AND OTHER CONTROLLERS, CONNECTORS, AND METHODS OF OPERATING SAME

(75) Inventors: Chang-il Son, Gyeonggi-do (KR); Sam-yong Bahng, Gyeonggi-do (KR); Jong-keun Ahn, Gyeonggi-do (KR); Sang-wook Kang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 375 days.

(21) Appl. No.: 10/895,666

(22) Filed: Jul. 21, 2004

(65) Prior Publication Data
US 2005/0021895 A1    Jan. 27, 2005

(30) Foreign Application Priority Data
Jul. 23, 2003    (KR) ...................... 10-2003-0050500

(51) Int. Cl.
G06K 19/06    (2006.01)
(52) U.S. Cl. ...................................... 235/482; 235/487
(58) Field of Classification Search ................ 235/492, 235/487, 476
See application file for complete search history.

(56) References Cited

U.S. PATENT DOCUMENTS

2004/0033727 A1* 2/2004 Kao ............................ 439/660
2004/0044819 A1* 3/2004 Jeon et al. ................... 710/305
2004/0087213 A1* 5/2004 Kao ............................ 439/638
2004/0182938 A1* 9/2004 Chen et al. ................. 235/492

FOREIGN PATENT DOCUMENTS

| JP | 2005044366 | * | 2/2005 |
|---|---|---|---|
| KR | 10-2001-0048173 A | | 6/2001 |
| KR | 10-2001-0095787 A | | 11/2001 |

OTHER PUBLICATIONS http:/www.kingston.com; *Digital Media Technical Guide*; Jul. 21, 2004.
Notice to Submit a Response for Korean Application No. 10-2003-0050500 mailed on Jan. 27, 2005.

* cited by examiner

Primary Examiner—Daniel Stcyr
(74) Attorney, Agent, or Firm—Myers, Bigel, Sibley & Sajovec, P.A.

(57) ABSTRACT

A removable memory card can include a plurality of connector contacts including a Universal Serial Bus (USB) controller module power contact and a separate controller module power contact configured to provide separate mutually exclusively applied voltage to the removable memory card.

19 Claims, 4 Drawing Sheets

FIG. 2

| Pin # | MMC Mode | | | SPI Mode | | | USB Mode | | |
|---|---|---|---|---|---|---|---|---|---|
| | Name | Type | Description | Name | Type | Description | Name | Type | Description |
| 1 | RSV | NC | Reserved | CS | I | Chip select | XO | O | Clock Output |
| 2 | CMD | IO | Command/Response | DI | I | Data In | D+ | IO | USB D+ Data |
| 3 | VSS1 | S | Ground | VSS | S | Ground | VSS1 | S | Ground |
| 4 | VDD | S | Power | VDD | S | Power | RSV | NC | Reserved |
| 5 | CLK | I | Clock | SCLK | I | Clock | XI | I | Clock Input |
| 6 | VSS2 | S | Ground | VSS2 | S | Ground | VSS2 | S | Ground |
| 7 | DAT | IO | Data | DO | O | Data Out | D− | IO | USB D− Data |
| 8 | − | − | − | − | − | − | VDDu | S | USB Power |

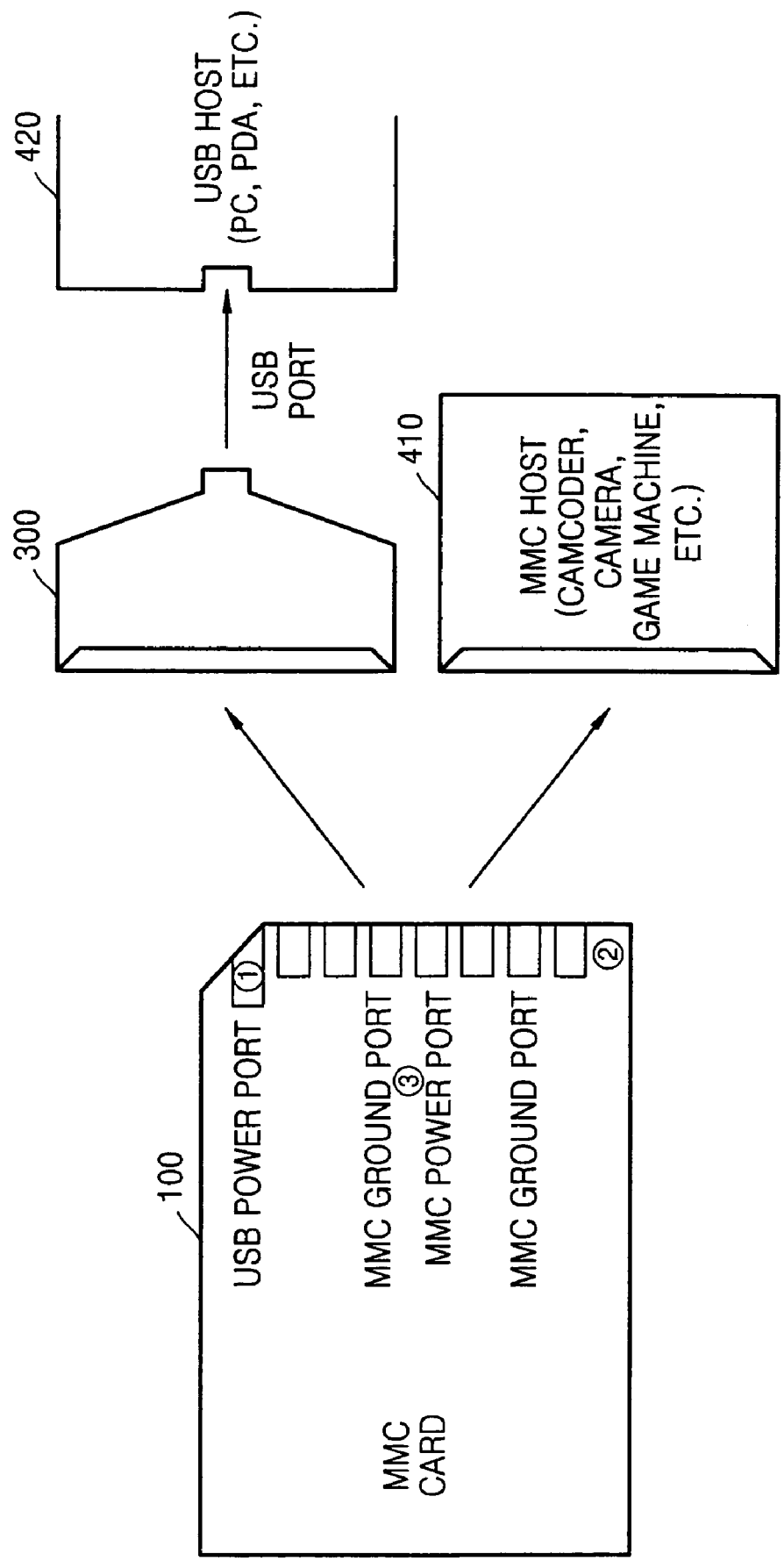

REMOVABLE MEMORY CARDS INCLUDING USB AND OTHER CONTROLLERS, CONNECTORS, AND METHODS OF OPERATING SAME

CROSS-REFERENCE TO RELATED APPLICATION

This application claims the priority of Korean Patent Application No. 2003-50500, filed on Jul. 23, 2003, in the Korean Intellectual Property Office, the disclosure of which is incorporated herein in its entirety by reference.

FIELD OF THE INVENTION

The invention relates to a memory card, and more particularly, to a memory card and connector for a Universal Serial Bus (USB) and a connection system thereof.

BACKGROUND

It is known to use NAND flash memory in many types of read/write memory cards such as: a Multi Media Card (MMC), a Secure Digital (SD) card, a Compact Flash (CF) card, and a memory stick, etc. A conventional MMC typically communicates only with an MMC type host, and therefore, may require a separate Universal Serial Bus (USB) reader to communicate with a USB host. However, many problems arise when trying to add a USB function to a conventional MMC controller, such as how to provide the needed clocks for the USB interface.

SUMMARY

Embodiments according to the invention can provide removable memory card storage devices including usb and other controllers, connectors, and methods of operating same. Pursuant to these embodiments, a removable memory card can include a plurality of connector contacts including a Universal Serial Bus (USB) controller module power contact and a separate controller module power contact configured to provide separate mutually exclusively applied voltage to the removable memory card.

In some embodiments according to the invention, a Multi-Media Card (MMC)/Secure Digital (SD) form-factor compliant memory card can include a plurality of connector contacts including a Universal Serial Bus (USB) power contact and a separate MMC/SD power contact configured to provide separate voltage supplies to the MMC/SD form-factor compliant memory card. In some embodiments according to the invention, the MMC/SD form-factor compliant memory card is included in an MMC/SD form-factor compliant singular housing.

In some embodiments according to the invention, the MMC/SD form-factor singular housing can have dimensions of about 32 mm×about 24 mm×about 1.4 mm. In some embodiments according to the invention, the USB power contact can be a connector contact on a beveled edge of the MMC/SD form-factor compliant singular housing. In some embodiments according to the invention, the MMC/SD power contact can be a connector contact at a center position on a straight edge of the MMC/SD form-factor compliant singular housing.

In some embodiments according to the invention, the plurality of contacts are arranged for USB or MMC/SD use on the straight edge from adjacent to the beveled edge as: a first USB clock output/a NC, first USB data input/CMD input, first ground input, MMC/SD power input, USB clock input/MMC clock input, second ground, second USB data input/MMC data input.

In some embodiments according to the invention, the MMC/SD form-factor compliant memory card operates according to a USB interface protocol via the plurality of connector contacts responsive to a USB voltage applied to the USB power contact and the MMC/SD form-factor compliant memory card operates according to an MMC/SD interface protocol via the plurality of connector contacts responsive to an MMC/SD voltage applied to the MMC/SD power contact.

In some embodiments according to the invention, the device can further include a non-volatile memory configured to store data for access. A Universal Serial Bus (USB) interface controller can be coupled to the plurality of connector contacts and to the non-volatile memory, configured to interface the MMC/SD form-factor compliant memory card to a USB host device according to a USB interface protocol responsive to a USB voltage applied to the USB power contact. An MMC interface controller can be coupled to the plurality of connector contacts and to the non-volatile memory, configured to interface the MMC/SD form-factor compliant memory card to an MMC/SD host device according to an MMC/SD interface protocol responsive to an MMC/SD voltage applied to the MMC/SD power contact. In some embodiments according to the invention, the USB voltage and the MMC/SD voltage are applied mutually exclusive of one another.

In some embodiments according to the invention, a connector can include a Multi-Media Card (MMC)/Secure Digital (SD) form-factor compliant memory card connector interface including a plurality of first contacts configured to interface to an MMC/SD form-factor compliant memory card. A standard Universal Serial Bus (USB) connector interface including a plurality of second contacts can be coupled to the plurality of first contacts and configured to interface to a USB compliant host device.

In some embodiments according to the invention, the plurality of first contacts are arranged for USB or MMC/SD use as: USB power input, a USB clock output/a NC, first USB data input/CMD input, first ground input, MMC/SD power input, USB clock input/MMC clock input, second ground input, second USB data input/MMC data input.

In some embodiments according to the invention, the connector can further include a voltage regulator coupled to the USB power input. A capacitor can be coupled between the USB power input and the first and second ground inputs. An oscillator circuit can be coupled between the first and second USB clock inputs. A first impedance matching resistor can be coupled to the first USB data input and a second impedance matching resistor can be coupled to the second USB data input.

In some embodiments according to the invention, the MMC/SD form-factor compliant memory card connector interface is configured to removably couple to a MMC/SD compliant singular housing. In some embodiments according to the invention, the removable MMC/SD compliant singular housing can have dimensions of about 32 mm×about 24 mm×about 1.4 mm.

In some embodiments according to the invention, a removable memory system can include an MMC/SD form-factor compliant memory card including a plurality of connector contacts including a Universal Serial Bus (USB) power contact and a separate MMC/SD power contact configured to provide separate voltage supplies to the MMC/SD form-factor compliant memory card and a connector.

The connector can include an MMC/SD form-factor compliant memory card connector interface including a plurality of first contacts configured to interface to the MMC/SD form-factor compliant memory card. A standard Universal Serial Bus (USB) connector interface including a plurality of second contacts can be coupled to the plurality of first contacts and configured to interface to a USB compliant host device.

In some embodiments according to the invention, a method of interfacing an MMC/SD form-factor compliant memory card to a standard USB host device can include applying a USB voltage from the USB host to the MMC/SD form-factor compliant memory card. Applying an MMC/SD voltage to the MMC/SD form-factor compliant memory card can be avoided while the USB voltage is applied. An access to a memory included in the MMC/SD form-factor compliant memory card can be received from the a USB host. Signals received from the USB host included in the access to the MMC/SD form-factor compliant memory card can be mapped to provide access to the memory.

BRIEF DESCRIPTION OF THE DRAWINGS

FIG. 2 is a table illustrating exemplary pin configuration of the memory card of FIG. 1.

FIG. 4 is a schematic view of a connector, a MMC/SD form-factor compliant memory card, and a USB host according to some embodiments of the invention.

DETAILED DESCRIPTION OF EMBODIMENTS ACCORDING TO THE INVENTION

Figure 1:
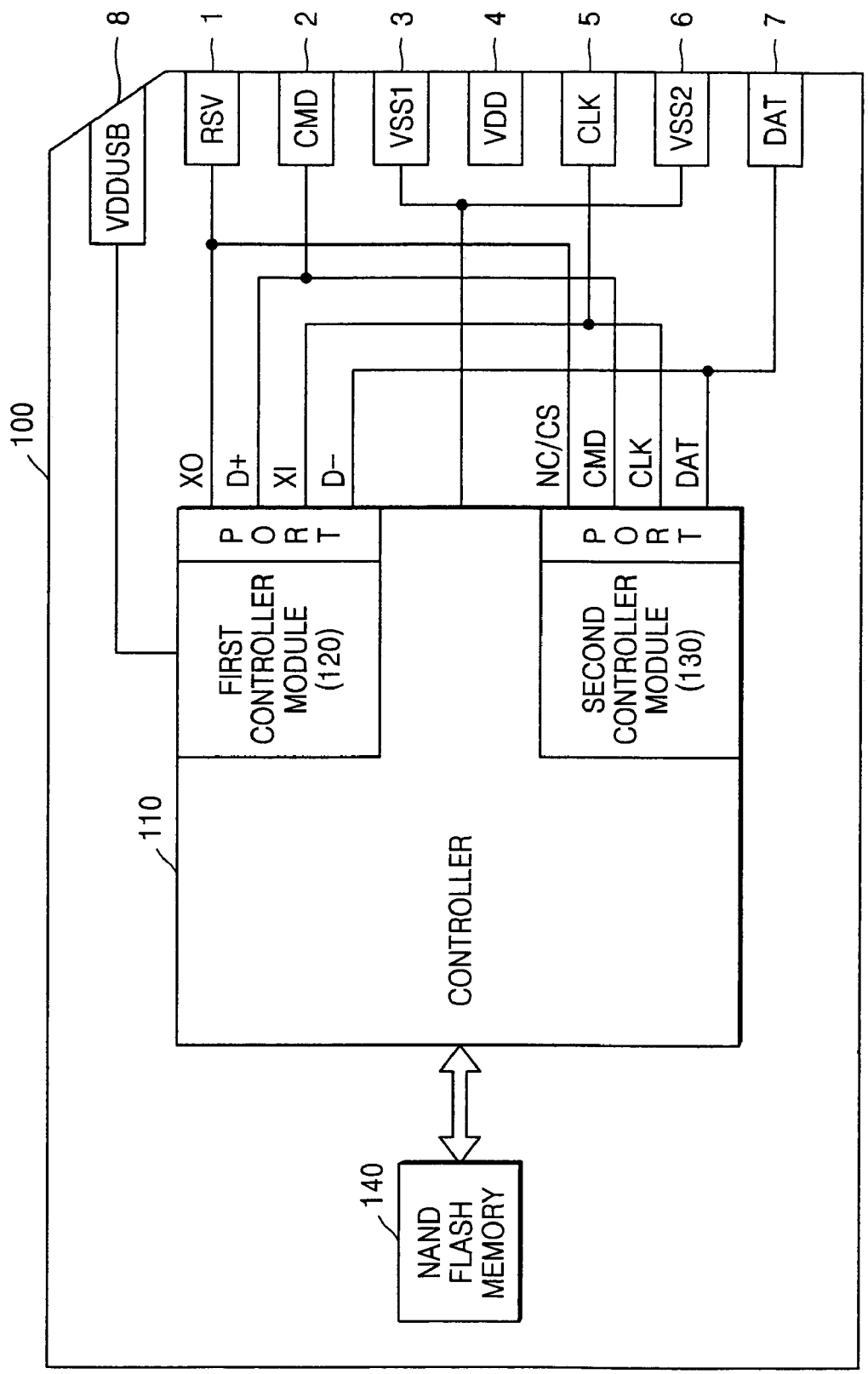
FIG. 1 is a schematic view of an MMC/SD form-factor compliant memory card according to some embodiments of the invention.

The invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIG. 1, a Multi-Media Card (MMC)/Secure Digital (SD) form-factor compliant memory card (or memory card) 100 according to some embodiments of the invention includes a Universal Serial Bus (USB) power pin (or contact) 8, a plurality of connection pins (or connector contacts) 1 through 7, and a controller 110.

As used herein, the term "form-factor" means the physical size and shape of the memory card. Moreover, the form-factor of memory cards according to some embodiments of the invention is described herein as a Multi-Media Card (MMC)/Secure Digital memory card that has a size and shape that allows such memory cards to be used with other compliant devices, such as readers. As known to those skilled in the art, SD represents a later developed version of the MMC standard which may allow MMC compliant memory cards to be used with SD compliant devices. In some embodiments according to the invention, MMC/SD form-factor compliant devices measure about 32 mm×about 24 mm×about 1.4 mm and can be shaped substantially as shown in FIGS. 1 and 4. The MMC and SD standards are discussed further on the world-wide-web at "www.mmca-.org."

The memory card 100 can be implemented according to various types (or standards) such as MMC and SD. For convenience, an MMC memory card will be described as an example of the memory card. The controller 110 communicates with an external host (not shown) through the USB power pin 8 and the connection pins 1 through 7. The controller 110 includes a first controller module 120 for controlling communication with a USB host (not shown) and a second controller module 130 (such as an MMC interface controller) for controlling communication with a host (not shown) other than a USB host.

The first controller module 120 operates in response to a supply voltage (such as a USB voltage) applied to the USB power pin 8. The second controller module 130 operates in response to a supply voltage (such as an MMC voltage) applied through a source voltage pin 4 among the plurality of connection pins 1 through 7. As shown in FIG. 1, in some embodiments according to the invention, the source voltage pin 4 is located at a center position among the pins on the straight edge of the memory card. In some embodiments according to the invention, the controllers and the pins are included as part of a singular housing that can be compliant with the mechanical dimensions specified as part of the different memory card standards (such as MMC and SD).

Hereinafter, the operation of the memory card 100 is described in detail with reference to FIG. 1. The memory card 100 includes the USB power pin (or connector contact) 8 as a separate pin for receiving a USB voltage from an external USB host (not shown). As shown in FIG. 1, in some embodiments according to the invention, the USB power pin 8 can be located on a beveled edge of the memory card, whereas the remaining plurality of pins are arranged along a straight edge of the memory card. It will also be understood that in some embodiments according to the invention, the USB power pin can be located at the opposite end of the edge. The first controller module 120 operates in response to the source voltage applied from the USB host via the USB power pin 8. The second controller module 130 operates in response to a source voltage applied from a MMC host (not shown). The USB power pin 8 is separate from a pin (or contact) for applying a source voltage to the second controller module 130 mutually exclusive of power being applied to the first controller module 120 via the USB power pin 8. In other words, if one of the first controller module 120 and the second controller module 130 receives the respective source voltage and operates, the other controller module does not operate.

That is, in some embodiments according to the invention, the operations of the first controller module 120 and the second controller module 130 are not separated by a specific recognition protocol but are divided by individually applying a source voltage. As a result, the first controller module 120 and the second controller module 130 can be included in the memory card 100, without the separately applied source voltages interfering.

In some embodiments according to the invention, while the first controller module 120 operates, the second controller module 130 may not consume current. Likewise, while the second controller module 130 operates, the first controller module 120 may not consume current. FIG. 2 is a table for explaining the pin configuration of the memory card of FIG. 1.

Hereinafter, the pin connections of the first controller module 120 and the second controller module 130 will be described with reference to FIGS. 1 and 2. Referring to FIG. 1, the memory card 100 has connection pins 1 through 7 as follows: an RSV pin 1, a command pin 2, ground pins 3 and 6, a source voltage pin 4, a clock pin 5, and a data pin 7. If the memory card 100 is connected to an external host (not shown) other than a USB host (not shown), that is, if the second controller module 130 is used, the RSV pin 1 is not connected and the command pin 2, the ground pins 3 and 6, the clock pin 5, and the data pin 7 are connected. If the memory card 100 is connected to an external USB host (not shown), that is, if the first controller module 120 is used, the first controller module 120 receives a clock signal through the clock pin 5 among the plurality of connection pins 1 through 7 and outputs the clock signal through the RSV pin 1.

In some embodiments according to the invention, the memory card 100 receives a clock signal generated by a crystal oscillator (not shown) via the clock pin 5 and outputs the clock via the RSV pin 1. In some embodiments according to the invention, where the memory card 100 receives a clock signal generated from an oscillator, only one of the clock pin 5 and the RSV pin 1 is used. Thus, the memory card 100 receives data through the command pin 2 and inversed data through the data pin 7. The first controller module 120 receives a source voltage applied from the USB host (not shown) through the USB power pin 8.

The first controller module 120 and the second controller module 130 share the ground pins 3 and 6 among the plurality of connection pins 1 through 7. In some embodiments according to the invention, the first controller module 120 may further include a regulator (not shown) for controlling a level of a source voltage applied through the USB power pin 8. The regulator acts to change the source voltage (generally, 5V) of the USB host into a voltage of 3.3V. In some embodiments according to the invention, the regulator may be located outside of the memory card 100. If located outside, the first controller module 120 receives a source voltage passed through the regulator at a source voltage of 3.3V through the USB power pin 8. If the regulator is located in the first controller module 120, a source voltage of 5V is received through the USB power pin 8.

In some embodiments according to the invention, other source voltages for circuits (not shown) in the controller 110 of the memory card 100 excluding the first controller module 120 and the second controller module 130 are received through the USB power pin 8 or the source voltage pin 4.

A source voltage to be supplied to the NAND flash memory 140 in the memory card 100 is received through the USB power pin 8 or the source voltage pin 4, or is provided by the controller 110. To operate the memory card 100 of FIG. 1 in connection with the external USB host, devices, such as an oscillator for generating clocks or resistors, may be needed. Therefore, in some embodiments according to the invention, a connector allowing communication between the memory card 100 and the USB host can include the needed components.

Figure 3:
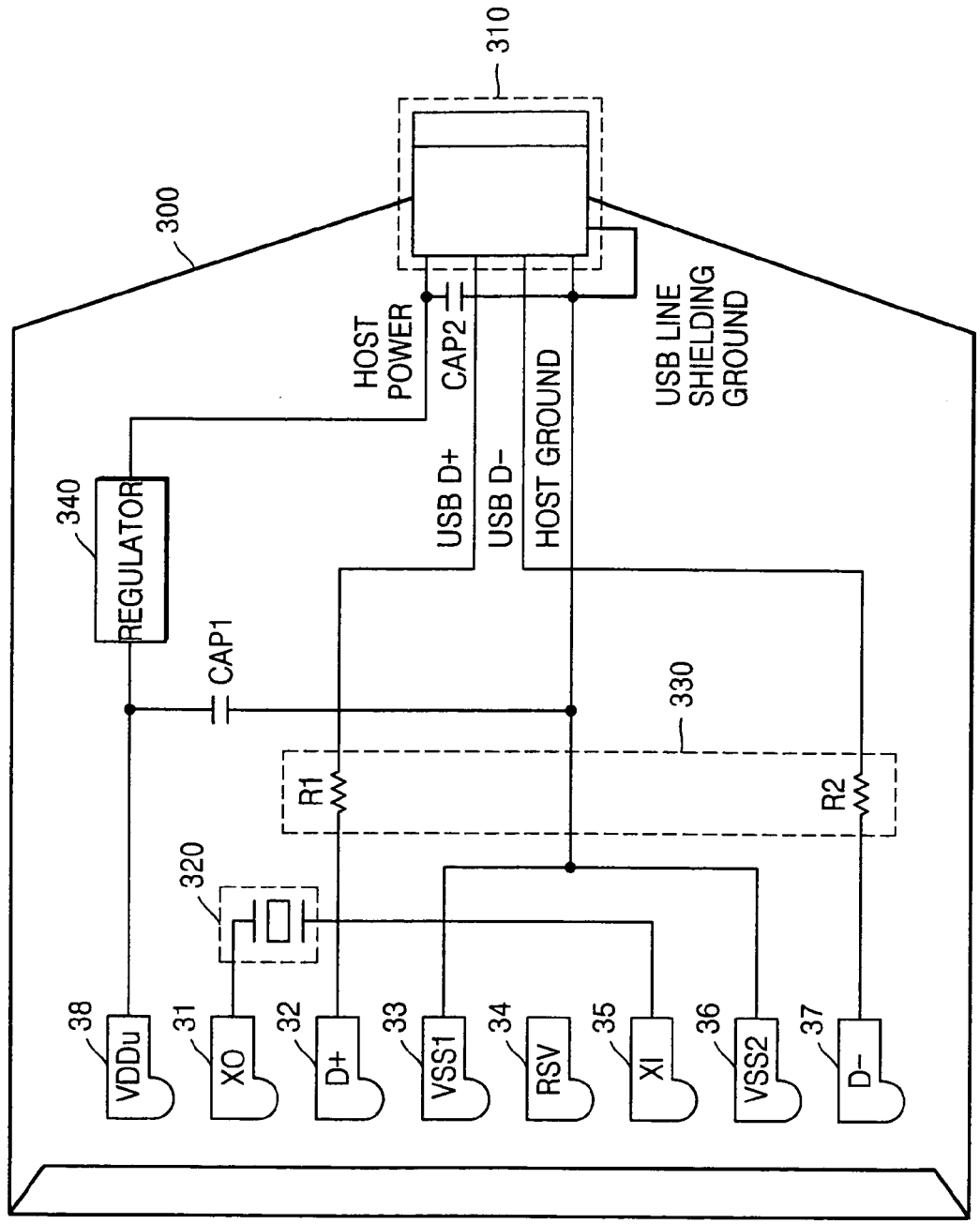
FIG. 3 is a schematic view of an MMC/SD form-factor compliant memory card connector according to some embodiments of the invention.

Referring to FIG. 3, a connector 300 according to some embodiments of the invention includes a pin 38 for supplying USB power, a plurality of supply connection pins 31 through 37, and a USB interface 310. The connector 300 communicates with an external memory card (not shown) through the USB power supply pin 38 and the supply connection pins 31 through 37, and communicates with an external USB host (not shown) via the USB interface 310. The connector 300 includes a clock oscillator circuit 320 for applying a clock signal to a memory card (not shown) and an impedance matching unit 330 for impedance matching of data and inversed data applied from a USB host (not shown).

In some embodiments according to the invention, the clock oscillation circuit 320 may be an oscillator or a crystal oscillator. The crystal oscillator is connected between a connection clock output pin 31 and a connection clock input pin 35 among the plurality of supply connection pins 31 through 37. The crystal oscillator outputs a clock signal to the memory card through the connection clock output pin 31 and receives a clock signal through the connection clock input pin 35. If the clock oscillation circuit 320 is an oscillator, the clock signal is applied to the memory card through one of the connection clock output pin 31 and the connection clock input pin 35.

In some embodiments according to the invention, the impedance matching unit 330 includes a first resistor R1 and a second resistor R2. The first resistor R1 is serially connected between a connection data pin 32 among the plurality of supply connection pins 31 through 37 and the USB interface 310. The first resistor R1 has a resistance value of about 22-44 Ω.

In some embodiments according to the invention, the second resistor R2 is serially connected between a connection inversed data pin 37 among the plurality of supply connection pins 31 through 37 and the USB interface 310. In some embodiments according to the invention, the second resistor R2 has a resistance value of about 22-44 Ω.

To receive data and inverted data from an external USB host (not shown), a line that transmits the data and inversed data and a line that receives the data and inverted data may be impedance-matched. Accordingly, the first resistor R1 and the second resistor R2 are resistors for impedance matching.

Connection ground pins 33 and 36 among the plurality of supply connection pins 31 through 37 are connected to a shielding ground of an external USB connected with the USB interface. There are generally four buses for USB communication and the shielding ground exists outside a cable surrounding the four buses. The shielding ground is connected to the connection ground pins 33 and 36. In the connector 300, capacitors CAP 1 and CAP 2 for stabilizing a source voltage transmitted through the USB power supply pin 38 are connected between the USB power supply pin 38 and the connection ground pins 33 and 36.

The connector 300 can further include a regulator 340 for controlling a source voltage level applied through the USB power supply pin 38, between the USB power supply pin 38 and the USB interface 310.

The regulator 340 changes a source voltage of 5V into a voltage of 3V. The regulator 340 can be located in the connector 300 or the first controller module 120 of the memory card 100 of FIG. 1.

Generally, to operate a USB driver at full speed, a pull-up resistor of about 3.3 KΩ should be connected to a bus to which data is applied. Also, if a device including a pull-up resistor is connected to a USB host (not shown), the USB host recognizes that a USB client is connected. In some embodiments according to the invention, the pull-up resistor is not located in the connector 300, but is connected to a pad of a data input buffer (not shown) in the first controller module 120 of the memory card 100 of FIG. 1 so as to prevent an error from being generated when the connector 300 is connected to the USB host without the memory card 100 of FIG. 1.

As such, the connector 300 of FIG. 3 includes the clock oscillation circuit 320, the first and second resistors R1 and R2, etc., which have not been installed in the memory card due to a thickness limitation in thickness of the memory card (so that, for example, the memory card can be form-factor compliant). The connector connects a memory card (not shown) with a USB host (not shown).

Referring to FIG. 4, the connection system according to some embodiments of the invention includes a memory card 100 and a connector 300. The memory card 100 includes a plurality of connection pins and a separate USB power pin for communication with a USB host 420. The connector 300 communicates with the memory card 100 using a USB power supply pin and a plurality of supply connection pins, and communicates with the USB host 420 using a USB interface.

The memory card 100 includes a controller 110. The control 110 includes a first controller module (not shown) for controlling communication with the USB host 420 and a second controller module (not shown) for controlling communication with a host 410 other than the USB host 420. The first controller module operates in response to a source voltage applied through a USB power pin. The second controller module operates in response to a source voltage applied through a source voltage pin among a plurality of connection pins.

The connector 300 includes a clock oscillation circuit (not shown) for applying a clock signal to the memory card 100 and an impedance matching unit (not shown) for matching impedance of data and inversed data applied from the USB host 420.

The memory card 100 further includes a separate USB power pin and receives a source voltage transferred from the USB host 420 via the connector 300 through the USB power pin. The USB power pin is added at a location ① or ② of the memory card 100. If the memory card 100 is a high speed MMC, the USB power pin is added at a location ③.

If the memory card 100 is connected to the USB host 420 through the connector 300, the first controller module 120 in the memory card 100 operates. If the memory card 100 is connected to the MMC host 410, the second controller module 130 in the memory card 100 operates.

The construction and operation of the memory card 100 and connector 300 have been described with reference to FIGS. 1 through 3, and therefore, the detailed descriptions thereof are omitted.

As described above, a memory card, a connector, and a connection system for connecting the memory card with the USB host, according to the invention, can increase expandability and efficiency of the memory card by allowing communication between the memory card and the USB host.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed:

1. A Multi-Media Card (MMC)/Secure Digital (SD) form-factor compliant memory card comprising a plurality of connector contacts including a Universal Serial Bus (USB) power contact and a separate MMC/SD power contact configured to provide separate voltage supplies to the MMC/SD form-factor compliant memory card,
wherein the MMC/SD form-factor compliant memory card is included in an MMC/SD form-factor compliant singular housing,
wherein the USB power contact comprises a connector contact on a beveled edge of the MMC/SD form-factor compliant singular housing,
wherein the MMC/SD power contact comprises a connector contact at a center position on a straight edge of the MMC/SD form-factor compliant singular housing.

2. A device according to claim 1 wherein the plurality of contacts are arranged for USB or MMC/SD use on the straight edge from adjacent to the beveled edge as: a USB clock output/a NC, first USB data input/CMD input, first ground input, MMC/SD power input, USB clock input/MMC clock input, second ground, second USB data input/MMC data input.

3. A Multi-Media Card (MMC)/Secure Digital (SD) form-factor compliant memory card comprising a plurality of connector contacts including a Universal Serial Bus (USB) power contact and a separate MMC/SD power contact configured to provide separate voltage supplies to the MMC/SD form-factor compliant memory card,
wherein the MMC/SD form-factor compliant memory card operates according to a USB interface protocol via the plurality of connector contacts responsive to a USB voltage applied to the USB power contact; and
wherein the MMC/SD form-factor compliant memory card operates according to an MMC/SD interface protocol via the plurality of connector contacts responsive to an MMC/SD voltage applied to the MMC/SD power contact.

4. A Multi-Media Card (MMC)/Secure Digital (SD) form-factor compliant memory card comprising a plurality of connector contacts including a Universal Serial Bus (USB) power contact and a separate MMC/SD power contact configured to provide separate voltage supplies to the MMC/SD form-factor compliant memory card;
a non-volatile memory configured to store data for access;

a Universal Serial Bus (USB) interface controller coupled to the plurality of connector contacts and to the non-volatile memory, configured to interface the MMC/SD form-factor compliant memory card to a USB host device according to a USB interface protocol responsive to a USB voltage applied to the USB power contact; and an MMC interface controller coupled to the plurality of connector contacts and to the non-volatile memory, configured to interface the MMC/SD form-factor compliant memory card to an MMC/SD host device according to an MMC/SD interface protocol responsive to an MMC/SD voltage applied to the MMC/SD power contact.

5. A device according to claim 4 wherein the USB voltage and the MMC/SD voltage are applied mutually exclusive of one another.

6. A memory card comprising:
a USB power pin;
a plurality of connection pins; and
a controller which controls communication with an external host through the USB power pin and the connection pins,
wherein the controller comprises a first controller module which controls communication with a USB host and a second controller module which controls communication with a host other than the USB host, and
the first controller module operates in response to a source voltage applied through the USB power pin and the second controller module operates in response to a source voltage applied through a source voltage pin among the plurality of connection pins.

7. The memory card of claim 6, being an MMC (Multi Media Card), wherein the second controller module is an MMC controller module.

8. The memory card of claim 7, wherein the first controller module and the second controller module share a ground pin among the plurality of connection pins.

9. The memory card of claim 7, wherein if one of the first controller module and the second controller module operates, the other thereof does not operate.

10. The memory card of claim 7, wherein the first controller module receives a clock signal through a clock pin among the plurality of connection pins, outputs the clock signal through an RSV pin, receives data through a command pin, and receives inversed data through a data pin.

11. The memory card of claim 7, wherein the first controller module further comprises a regulator for controlling a source voltage level applied through the USB power pin.

12. A connector comprising:
a Multi-Media Card (MMC)/Secure Digital (SD) form-factor compliant memory card connector interface including a plurality of first contacts configured to interface to an MMC/SD form-factor compliant memory card; and
a standard Universal Serial Bus (USB) connector interface including a plurality of second contacts coupled to the plurality of first contacts and configured to interface to a USB compliant host device wherein the plurality of first contacts are arranged for USB or MMC/SD use as: USB power input, a USB clock output/a NC (No Connect), first USB data input/CMD (Command) input, first ground input, MMC/SD power input, a USB clock input/MMC clock input, second ground input, second USB data input/MMC data input.

13. A connector according to claim 12 further comprising:
a voltage regulator coupled to the USB power input;
a capacitor coupled between the USB power input and the first and second ground inputs;
an oscillator circuit coupled between the USB input and output clocks;
a first impedance matching resistor coupled to the first USB data input; and
a second impedance matching resistor coupled to the second USB data input.

14. A connector according to claim 12 wherein the MMC/SD form-factor compliant memory card connector interface is configured to removably couple to a MMC/SD compliant singular housing.

15. A connector according to claim 14 wherein the removable MMC/SD compliant singular housing comprises dimensions of about 32 mm×about 24 mm×about 1.4 mm.

16. A removable memory system comprising:
an MMC/SD form-factor compliant memory card including a plurality of connector contacts including a Universal Serial Bus (USB) power contact and a separate MMC/SD power contact configured to provide separate voltage supplies to the MMC/SD form-factor compliant memory card; and
a connector including
an MMC/SD form-factor compliant memory card connector interface including a plurality of first contacts configured to interface to the MMC/SD form-factor compliant memory card; and
a standard Universal Serial Bus (USB) connector interface including a plurality of second contacts coupled to the plurality of first contacts and configured to interface to a USB compliant host device.

17. A removable memory system according to claim 16 further comprising:
a voltage regulator coupled to the USB power input;
a capacitor coupled between the USB power input and the first and second ground inputs;
an oscillator circuit coupled between the USB input and output clocks;
a first impedance matching resistor coupled to the first USB data input; and
a second impedance matching resistor coupled to the second USB data input.

18. A removable memory system according to claim 16 wherein the MMC/SD form-factor compliant memory card connector interface is configured to removably couple to the MMC/SD form-factor compliant memory.

19. A method of interfacing an MMC/SD form-factor compliant memory card to a standard USB host device:
applying a USB voltage from the USB host to the MMC/SD form-factor compliant memory card; and
avoiding applying an MMC/SD voltage to the MMC/SD form-factor compliant memory card while the USB voltage is applied; and
receiving an access to a memory included in the MMC/SD form-factor compliant memory card from the a USB host; and
mapping signals received from the USB host included in the access to the MMC/SD form-factor compliant memory card to provide access to the memory.

* * * * *